United States Patent [19]
Masumoto et al.

[11] Patent Number: 5,152,213

[45] Date of Patent: Oct. 6, 1992

[54] HYDROEXTRACTOR

[75] Inventors: Norio Masumoto, Ichinomiya; Hyosuke Nagase, Nagoya; Kazuo Kobayashi, Chiba, all of Japan

[73] Assignees: Hitachi Ltd. Goritsu Mfg Co., Chiyoda; Hyosuke Nagase, Nagoya, both of Japan

[21] Appl. No.: 838,914

[22] Filed: Feb. 21, 1992

[30] Foreign Application Priority Data

Feb. 22, 1991 [JP] Japan .................. 3-028232
Dec. 4, 1991 [JP] Japan .................. 3-320196

[51] Int. Cl.⁵ .................. B30B 9/06; B30B 9/22; D06F 47/06
[52] U.S. Cl. .................. 99/495; 68/242; 99/458; 99/465; 100/116; 100/125; 100/211
[58] Field of Search .................. 99/495, 510, 511, 484, 99/349, 458, 465; 100/112, 115, 116, 122, 125, 211; 68/210, 242; 210/227-229, 224, 231, 350

[56] References Cited

U.S. PATENT DOCUMENTS

| | | | |
|---|---|---|---|
| 1,349,544 | 8/1920 | Angel | 100/115 |
| 3,307,236 | 3/1967 | Sirera | 100/113 |
| 3,613,563 | 10/1971 | Sumskaya et al. | 100/115 |
| 3,872,695 | 3/1975 | Busek | 68/242 |
| 4,660,608 | 4/1987 | Arai | 100/116 |
| 4,676,902 | 6/1987 | Fayoux et al. | 210/350 |
| 4,684,466 | 8/1987 | Terpstra | 210/231 |
| 4,753,089 | 6/1988 | Engel | 68/242 |
| 4,844,803 | 7/1989 | Urech et al. | 210/227 |
| 4,855,011 | 8/1989 | Legge et al. | 100/211 |
| 5,001,911 | 3/1991 | Eck et al. | 100/211 |

FOREIGN PATENT DOCUMENTS

| | | |
|---|---|---|
| 3729250 | 1/1989 | Fed. Rep. of Germany |
| 3842662 | 6/1990 | Fed. Rep. of Germany |
| 0285310 | 12/1990 | Fed. Rep. of Germany ...... 100/211 |
| 1471712 | 3/1966 | France |
| 0285957 | 12/1986 | Japan ...... 99/495 |
| 7810602 | 5/1979 | Netherlands ...... 68/242 |

OTHER PUBLICATIONS

"Continuous, Automatic—Operation Hydroextractor" by Kabusiki-Kaisha Sanyu, pp. 1-12, Showa 57th (1982).

Primary Examiner—Timothy F. Simone
Attorney, Agent, or Firm—Antonelli, Terry, Stout & Kraus

[57] ABSTRACT

A hydroextractor in which a liquid material to be processed can be introduced into a hydroextracting chamber under a small pressure and the chamber can be filled with the material in a short period of time to thereby improve the operational efficiency, and a cake of the hydroextracted material can be easily removed from the hydroextracting chamber. For these purposes, this hydroextractor is arranged such that upper and lower filter cloths are provided at the top and the bottom of the hydroextracting chamber extending substantially horizontally, and that a diaphragm (8) shaped like an inverted dish is disposed on the upper surface of the upper filter cloth. Further, a pressure chamber is provided on the upper side of the diaphragm. The hydroextracting operation is performed by filling the liquid material in the hydroextracting chamber and generating a pressure in the pressure chamber so as to press the diaphragm downwardly.

10 Claims, 12 Drawing Sheets

HYDROEXTRACTOR

BACKGROUND OF THE INVENTION

1. Industrial Field of the Invention

The present invention relates to a hydroextractor.

2. Description of the Prior Art

Conventionally, in order to hydroextract a bean stew to make semi-solid bean jam or hydroextract other liquid materials, there has generally been used a hydroextractor in which a pair of filter cloths extend vertically in parallel to form a vertical hydroextracting chamber therebetween, and rubber plates are provided on the outer surfaces of these filter cloths. A liquid material to be processed is introduced into the hydroextracting chamber under pressure, while the rubber plates are inflated due to the pressure of the liquid material. After that, the rubber plates are pressed from the outside so as to squeeze and hydroextract the liquid material.

SUMMARY OF THE INVENTION

In the conventional hydroextractor, when the hydroextracting chamber is filled with the liquid material, it is necessary to perform the introduction of the material at high pressure because the rubber plates must be also inflated by this pressure, and there is another problem that the filling time is rather long. Besides, cakes of semi-solid bean jam or the like remaining in the hydroextracting chamber stick to the filter cloths extending vertically. Consequently, the cakes must be scraped off by a spatula or such separation means, which results in a further problem that the separation operation involves difficulty.

It is therefore an object of the present invention to provide a hydroextractor by which the problems can be solved.

In order to solve the problems, a hydroextractor according to the invention is characterized in that it comprises a hydroextracting chamber defining member extending substantially horizontally to define a hydroextracting chamber which is openable at the top and the bottom, upper and lower filter cloths provided at the top and the bottom of the hydroextractor chamber, a diaphragm placed substantially horizontally on the upper side of the upper filter cloth, a pressure chamber formed on the upper side of the diaphragm, and raising and lowering means for pressing the hydroextracting chamber defining member against the lower filter cloth and detaching it from the lower filter cloth, the diaphragm being shaped like an inverted dish, including peripheral end portions to be fixed, bent portions on the inner sides of the peripheral end portions, and tapered portions on the inner sides of the bent portions, which tapered portions are raised gradually toward the center.

In the above-described structure of the present invention, the diaphragm has a central portion raised upwardly at the early stage of the hydroextracting operation, and a liquid material to be processed is forcibly introduced into the hydroextracting chamber with the diaphragm of this state.

After the hydroextracting chamber is filled with the material, a pressure is generated in the pressure chamber so as to press the central portion of the diaphragm downwardly to substantially the same level as the peripheral end portions, thereby squeezing the material.

As a result of such squeezing, free water is hydroextracted from the liquid material through the upper and lower filter cloths.

After hydroextracting, the pressure in the pressure chamber is decreased. Then, the central portion of the diaphragm automatically recovers the upper position due to the resilient force of the bent portions and the diaphragm is detached from a cake of the hydroextracted material.

Next, the diaphragm as well as the upper filter cloth is lifted upwardly, and the cake left on the lower filter cloth is removed from the hydroextractor.

In order to further facilitate the cake releasing operation, the above-described structure may include separation means for introducing the compressed air between the diaphragm and the upper filter cloth and separating the upper filter cloth from the diaphragm.

After performing the hydroextraction and decreasing of the pressure in the pressure chamber similarly to the above case, the compressed air is forcibly introduced between the diaphragm and the upper filter cloth by means of the separation means. Then, the central portion of the diaphragm returns to the upper position owing to the resilient force of the bent portions and the pressure of the compressed air, and the upper filter cloth is forcibly separated from the diaphragm. Also, the compressed air acts on the surface of the cake through the upper filter cloth so as to separate the upper filter cloth from the cake. Further, the impact of the original form recovery of the diaphragm and the impact of the introduction of compressed air accelerate the separation of the cake.

Even if some part of the cake sticks to the side of the diaphragm during the cake releasing operation, it can be detached and removed by the separation means without fail.

DETAILED DESCRIPTION OF PREFERRED EMBODIMENT

Figure 1:
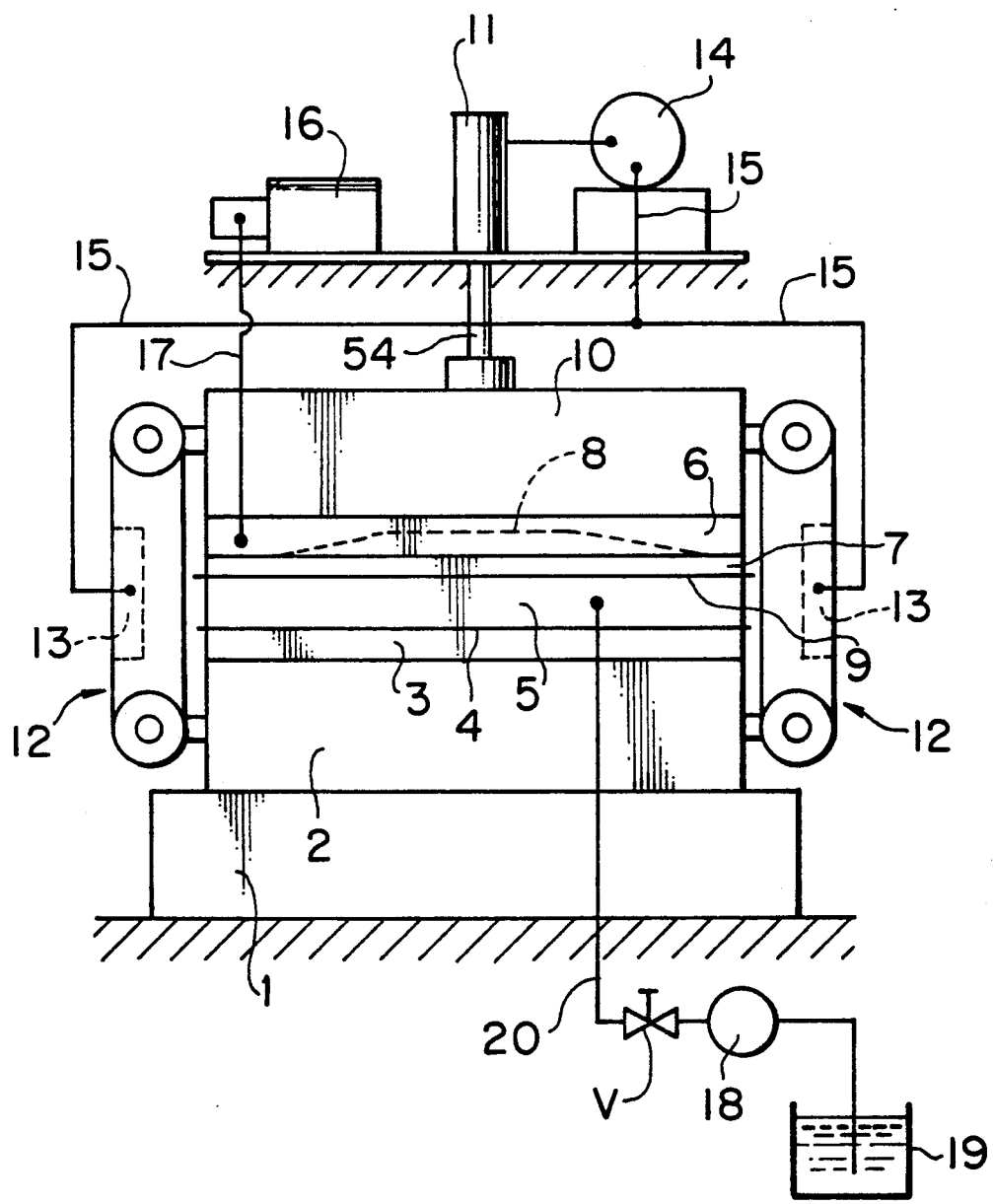
FIG. 1 is a schematic elevational view of one embodiment according to the present invention.

Referring to FIG. 1, there is provided a base 1 on which a stationary block 2 is fixed. A drain plate 3 is securely mounted on the stationary block 2, and a lower filter cloth 4 is placed over the upper surface of the drain plate 3. A hydroextracting chamber defining member 5 is disposed on the lower filter cloth 4 and arranged to be raised and lowered separately from the filter cloth 4 and the drain plate 3. There is also provided a pressure chamber defining member 6, and an attachment 7 is fixed on the lower surface of the member 6 so that the peripheral ends of a diaphragm 8 provided within the pressure chamber defining member 6 are held between and supported by these two members 6 and 7. Both the members 6 and 7 are arranged to be raised and lowered separately from the hydroextracting chamber defining member 5. An upper filter cloth 9 is interposed between the attachment 7 and the hydroextracting chamber defining member 5. These members all extend substantially horizontally.

There is further provided a movable block 10 which can be operated vertically by a first hydraulic cylinder mechanism 11 serving as raising and lowering means, and the pressure chamber defining member 6 is firmly fixed to the lower surface of this movable block 10. A pair of lock mechanisms 12 for connecting the stationary block 2 and the movable block 10 are installed on the left and right. A second hydraulic cylinder mechanism 13 is provided in each of the lock mechanisms 12 so that the operation of the second mechanism 13 causes the lock mechanism 12 to be locked and released. A hydraulic pressure is supplied to the first and second hydraulic cylinder mechanisms 11 and 13 from a hydraulic pump 14 through a supply pipe 15 of the hydraulic pressure.

A fluid pressure is supplied from a fluid pump 16 into the pressure chamber defining member 6 via a supply pipe 17.

There is also provided a pump 18 for pressurizing a liquid material to be hydroextracted and supplying it from a tank 19 into the hydroextracting chamber defining member 5 through a supply pipe 20 of the material to be processed.

Figure 2:
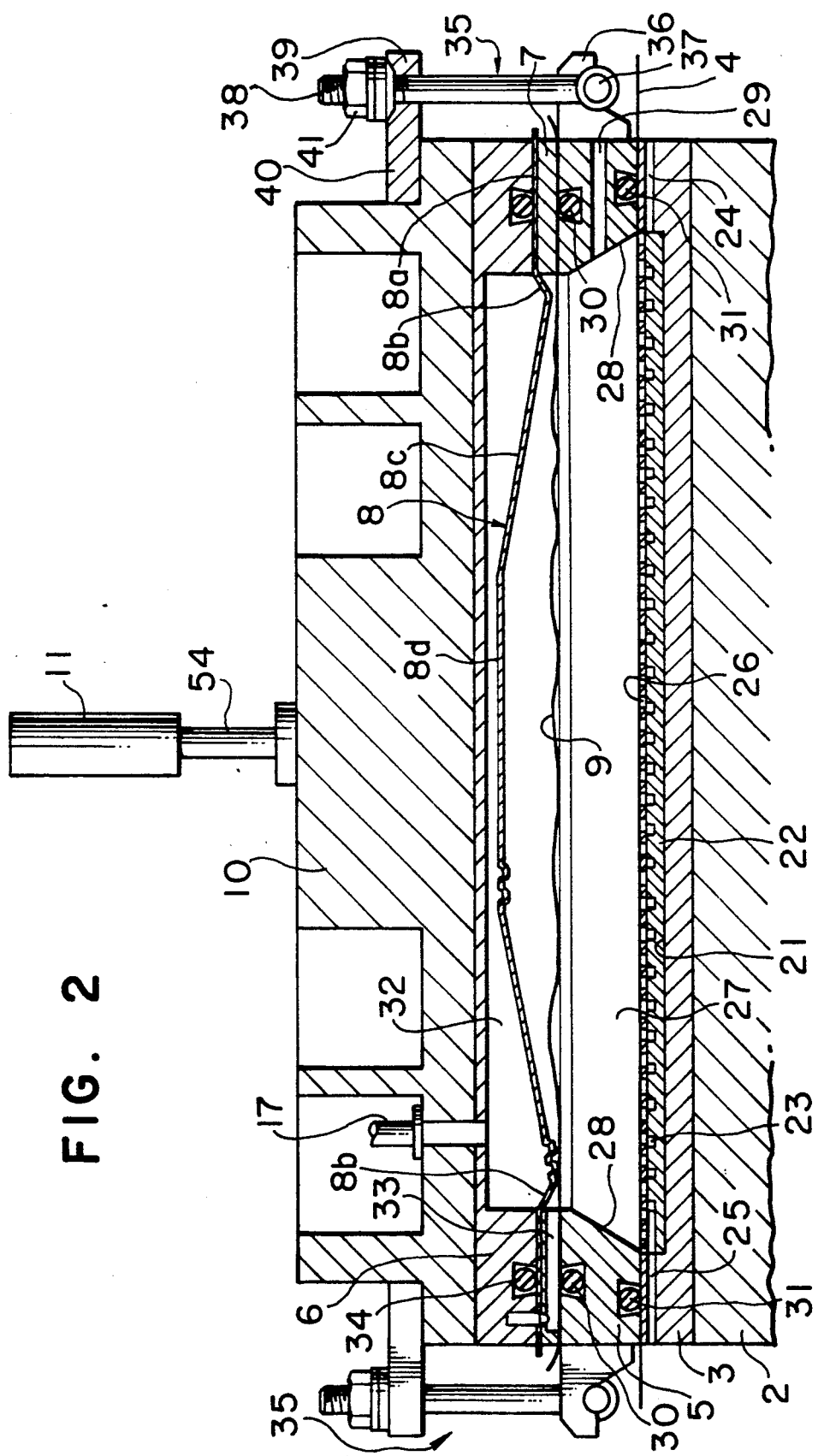
FIG. 2 is an elevational cross-sectional view showing an essential portion of FIG. 1.
Figure 3:
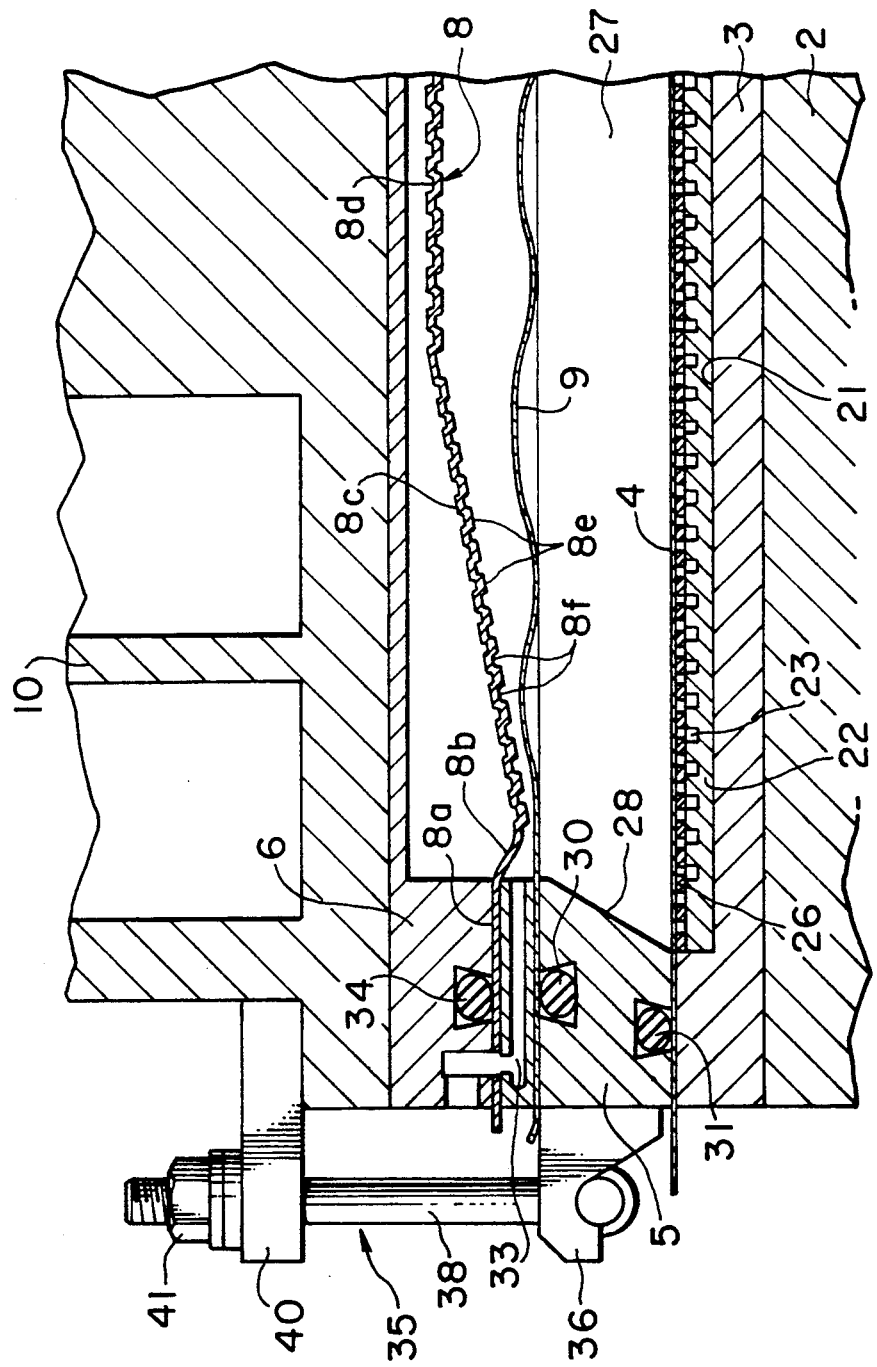
FIG. 3 is an enlarged elevational cross-sectional view showing an essential portion of FIG. 2.
Figure 4:
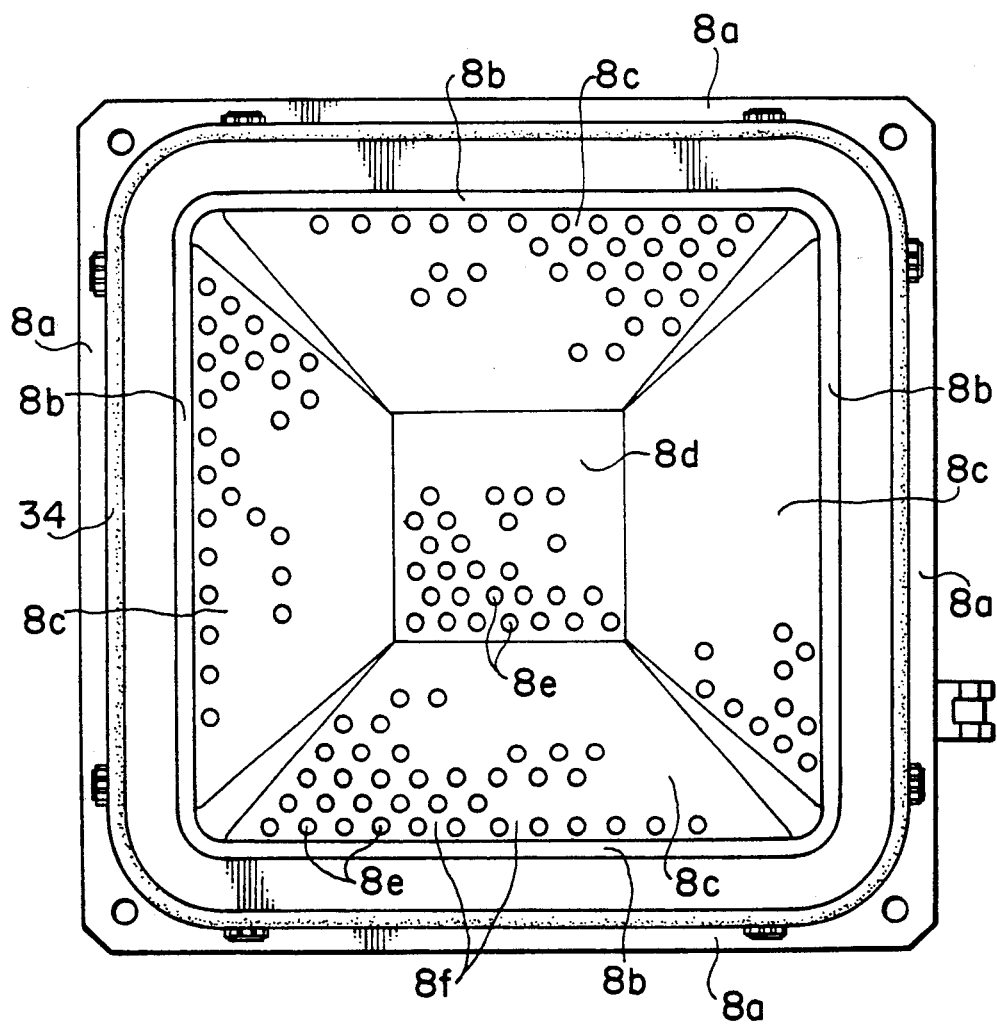
FIG. 4 is a plan view of a diaphragm.

Referring next to FIGS. 2 to 4, a hydroextracting unit will be fully described.

The drain plate 3 fixed on the stationary block 2 is formed of a substantially square plate, as viewed from above, and includes a square recessed portion 21 formed on the upper surface.

A strainer plate 22 is closely fitted in the recessed portion 21, and a groove-like drain path 23 is formed on the upper surface of the strainer plate 22. The drain path 23 is made of a single groove extending continuously in a zigzag form, and one end of the path is connected to a pressurized air inlet 24 while the other end thereof is connected to a drain hole 25.

A perforated metal plate 26 is fixed on the upper surface of the strainer plate 22.

The drain plate 3 has the upper peripheral surface flush with the upper surface of the perforated metal plate 26, and the lower filter cloth 4 is placed over these surfaces.

A hydroextracting chamber 27 is formed in a central portion of the hydroextracting chamber defining member 5, and the hydroextracting chamber 27 is of a square shape as viewed from above and open at the top and the bottom. Each peripheral wall 28 of the hydroextracting chamber 27 is tapered so that the chamber is gradually enlarged toward the bottom. A pressurized liquid material inlet 29 is formed in a peripheral wall of the hydroextracting chamber defining member 5, and is connected to the supply pipe 20 from the pump 18. Sealing O-rings 30 and 31 are secured in the hydroextracting chamber defining member 5.

A pressure chamber 32 is formed in a central portion of the pressure chamber defining member and located opposite to the hydroextracting chamber 27. The pressure chamber 32 is designed to be open at the bottom, and the width of the bottom opening substantially coincides to that of the upper opening of the hydroextracting chamber 27. The supply pipe 17 is connected to the pressure chamber 32.

The diaphragm 8 is provided within the pressure chamber 32, with each peripheral end portion 8a thereof being secured to the lower surface of the pressure chamber defining member 6 by the attachment 7.

FIGS. 2 and 3 show the diaphragm 8 in cross section, and FIG. 4 is a plan view of the same. More specifically, a portion on the inner side of each of the horizontal peripheral end portions 8a at four sides is bent downwardly to form a bent portion 8b, and a portion on the inner side of the bent portion 8b is raised gradually toward the center to form a tapered portion 8c, a central portion 8d being formed substantially horizontally. Thus, the diaphragm 8 is shaped like an inverted dish. A large number of circular projections 8e projecting toward the hydroextracting chamber 27 are formed at certain intervals on the entire surface of the tapered portions 8c and central portion 8d of the diaphragm 8. Flow paths 8f are formed between the projections 8e.

The diaphragm 8 is formed of a hard synthetic-resin plate, which usually maintains the above-described state with the central portion being raised. When the diaphragm 8 is pressed from above, the bent portions 8b formed at its peripheral regions are moved outwardly, and the central portion 8d reaches substantially the same level a the peripheral end portions 8a. When the diaphragm 8 in this state is released from the pressing force from above, the diaphragm 8 automatically recovers the original state indicated by solid lines in the drawings due to the resilient force of the bent portions 8b.

The upper filter cloth 9 interposed between the hydroextracting chamber defining member 5 and the attachment 7 is fixed on the side of the attachment 7. Also, that portion of the upper filter cloth 9 which is located in the hydroextracting chamber 27 is slightly slack so that it can follow the inner surface of the diaphragm 8 when the central portion thereof is raised up, as shown in the drawings. The attachment 7 is formed with a drain hole 33 which is opened between the diaphragm 8 and the upper filter cloth 9. Reference numeral 34 denotes a sealing O-ring.

A metallic fastener means 35 comprises a connecting rod 38 provided on a support plate 36 fixed on the outer peripheral surface of the hydroextracting chamber defining member 5, which rod can be swung vertically about a pivot 37; a holder 40 fixed on the outer peripheral surface of the movable block 10 and formed with a groove 39 in which the connecting rod 38 is engaged detachably; and a nut 41 to be screw-connected to the connecting rod 38 which is engaged with the holder 40.

Each of the lock mechanisms 12 will now be described with reference to FIGS. 5 to 8.

This lock mechanism 12 is provided separately from the metallic fastener means 35.

Figure 5:
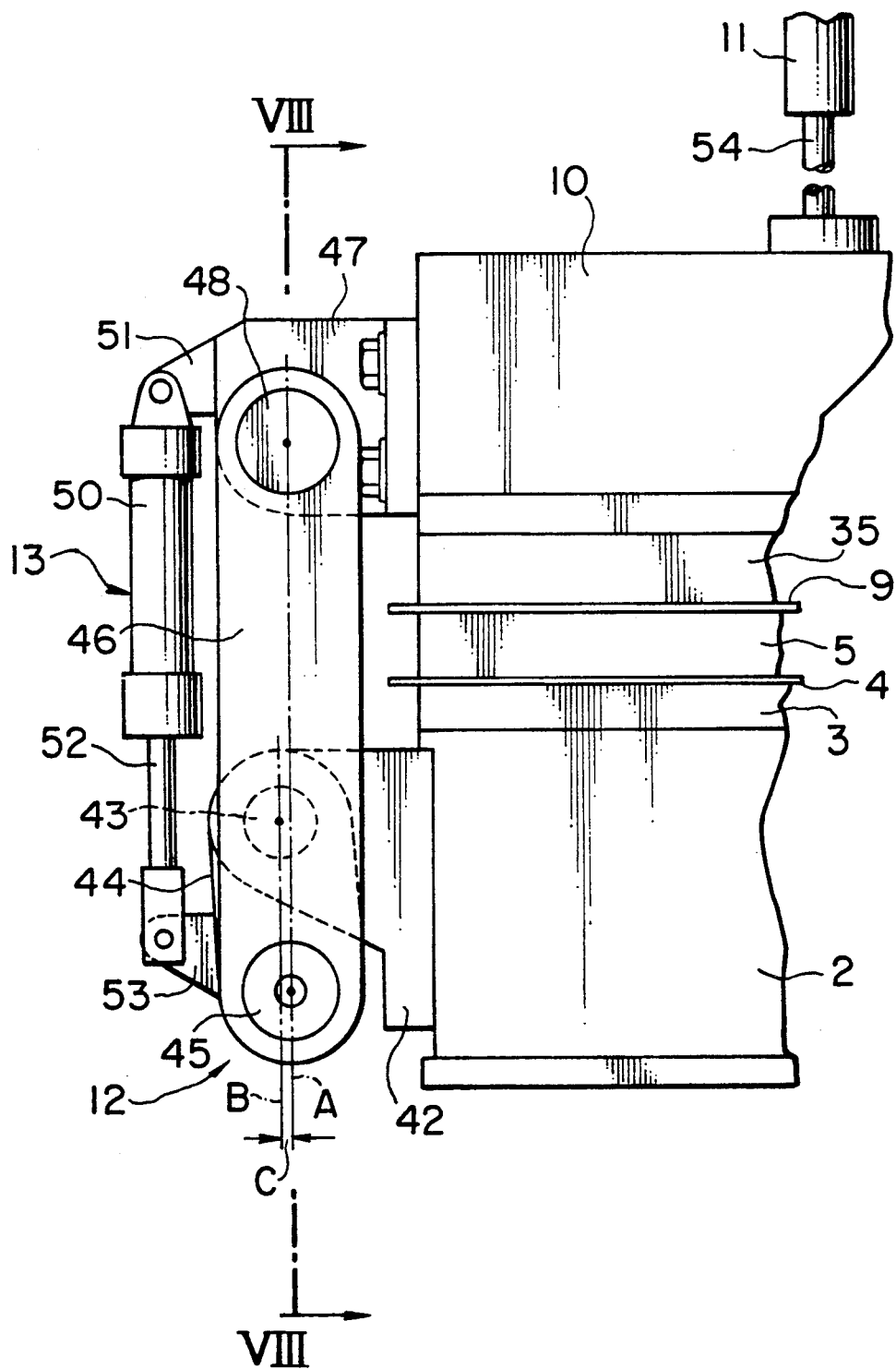
FIG. 5 is an elevational view of a lock mechanism.

A lower bracket 42 is fixed on the outer peripheral surface of the stationary block 2, and it includes a rotation shaft 43. A first lever 44 is rotatably connected to the rotation shaft 43. The first lever 44 includes a rotation shaft 45 at the distal end. A second lever 46 is rotatably connected to the rotation shaft 45. These two levers constitute a link mechanism. An upper bracket 47 is fixed on the outer peripheral surface of the movable block 10, and it includes a rotation shaft 48 to which the other end of the second lever 46 is rotatably connected. As shown in FIG. 5, these three shafts 43, 45 and 48 are arranged such that a line A passing through the centers of the rotation shafts 45 and 48 is located slightly inwardly at a distance C from the center B of the rotation shaft 43. Consequently, the mechanism can be securely locked with the rotation shaft 45 being situated beyond its dead center.

The proximal end of a hydraulic cylinder 50 of each of the second hydraulic cylinder mechanism 13 is rotatably connected to a lug 51 fastened on the movable block 10, and the distal end of a piston rod 52 for this cylinder is rotatably connected to a lug 53 fastened on the first lever 44.

With this embodiment, the operation of hydroextracting a bean stew and producing semi-solid bean jam will be described next.

As shown in FIGS. 1 and 2, the pressure chamber defining member 6 is set under the pressurized condition on the hydroextracting chamber defining member 5. The diaphragm 8 has the central portion raised up, as indicated by the solid lines in FIG. 2, while the upper filter cloth 9 is placed under the diaphragm 8. In this condition, a valve V is opened, and the pump 18 is actuated to forcibly supply the bean stew from the tank 19 via the supply pipe 20 and introduce it into the hydroextracting chamber 27 through the pressurized material inlet 29.

Due to the pressure of the liquid material thus introduced, the upper filter cloth 9 is pressed upwardly. At this stage, preliminary hydroextraction is performed under the hydroextracting chamber 27 through the lower filter cloth 4, the perforated metal plate 26, the drain path 23 and the drain hole 25.

At the time of the introduction of the material, the diaphragm 8 has the central portion raised up, and accordingly the hydroextracting chamber 27 has a large volume. Therefore, the material introduction pressure may be much smaller than that in the conventional case where the rubber plates are inflated.

The introduction of the bean stew is continued until the hydroextracting chamber 27 is filled up. Then, the pump 18 is stopped, and the valve V is closed.

Next, the fluid pump 16 is actuated to introduce the pressurized water into the pressure chamber 32 through the supply pipe 17. Due to this fluid pressure, the central portion of the diaphragm 8 is pressed downwardly, and the bean stew in the hydroextracting chamber 27 is squeezed. As a result, free water squeezed from the bean stew is passed through the lower filter cloth 4 and discharged from the drain hole 25 in the same flow as the preliminary hydroextraction. Also, free water resulting from hydroextraction through the upper filter cloth 9 flows in the flow paths 8f of the diaphragm 8 and is discharged from the drain hole 33 to the outside.

After the central portion 8d of the diaphragm 8 is pressed down to substantially the same level as the peripheral end portions 8a and the pressure operation is completed, the fluid pump 16 is stopped to decrease the fluid pressure in the pressure chamber 32. When the fluid pressure in the pressure chamber 32 is decreased, the diaphragm 8 automatically recovers the original state indicated by the solid lines in FIGS. 2 and 3 due to the resilient force of the bent portions 8b. Consequently., the diaphragm 8 moves up and is detached from the hydroextracted bean jam in the hydroextracting chamber 27.

Then, the air is forcibly introduced from the pressurized air inlet 24 so as to discharge water remaining in the drain path 23 out of the drain hole 25.

Next, each of the lock mechanisms 12 is released. The releasing method is such that the hydraulic pump 14 is operated to move the piston rod 52 of the second hydraulic cylinder mechanism 13 in the retreating direction, to swing the first lever 44 slightly in the clockwise direction about its rotation shaft 43, and to displace the center of the rotation shaft 45 outwardly from the axial center B of the rotation shaft 43.

Figure 6:
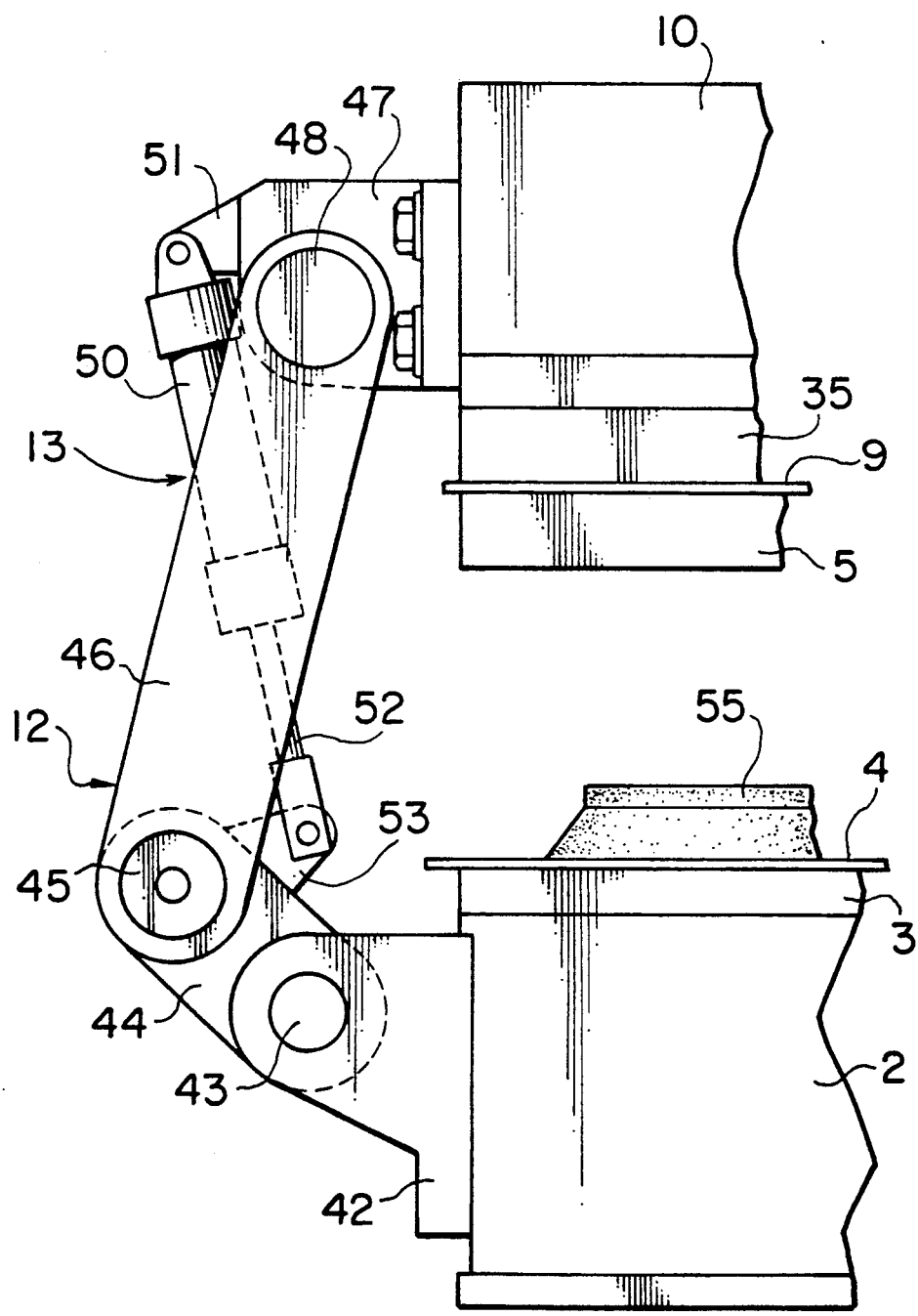
FIG. 6 is an elevational view of the lock mechanism shown in FIG. 5 when a cake is released from a hydroextracting chamber.
Figure 7:
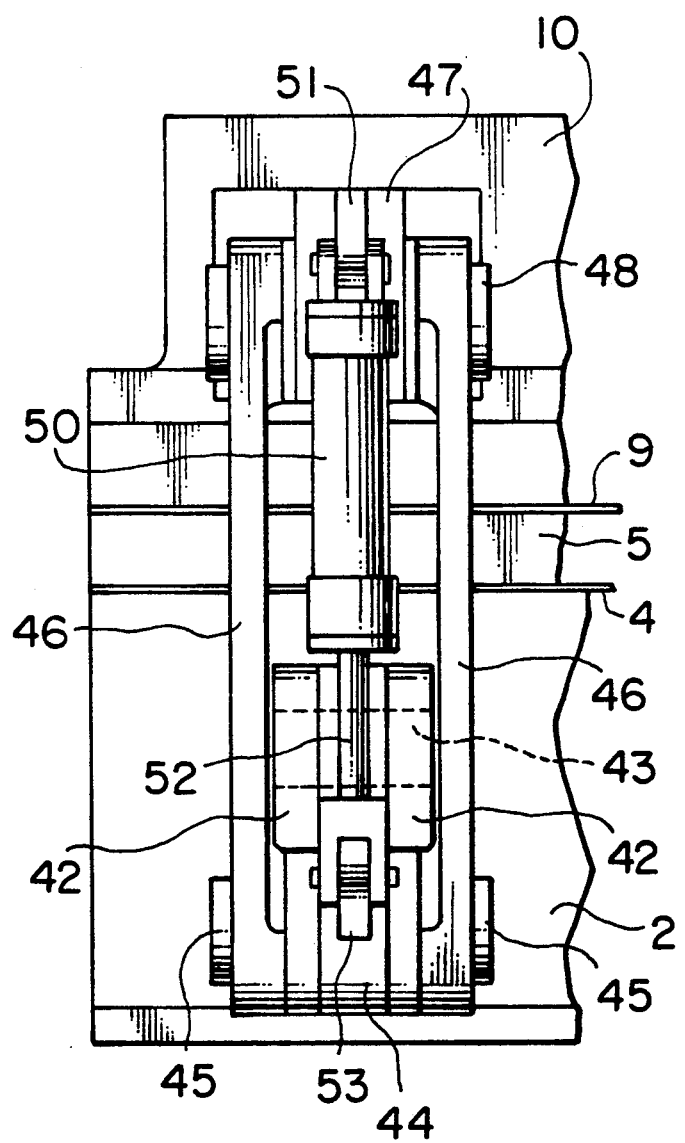
FIG. 7 is a side view of the lock mechanism shown in FIG. 5.
Figure 8:
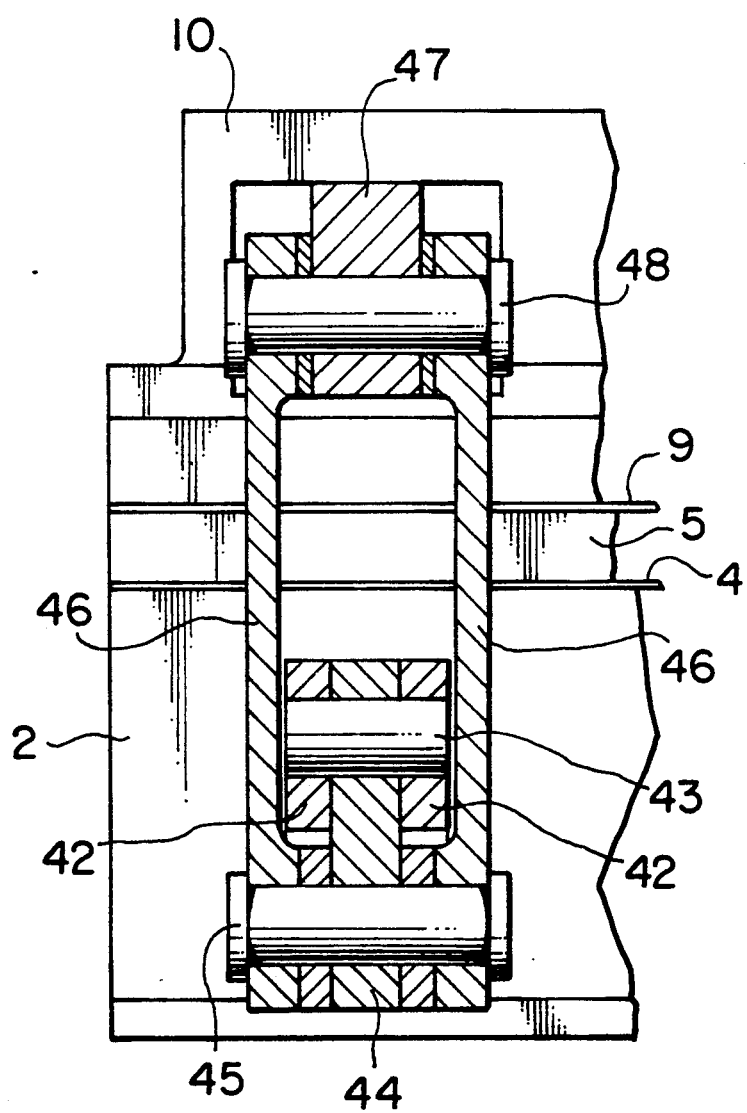
FIG. 8 is a cross-sectional view taken along a line VIII—VIII of FIG. 5.

Subsequently, the hydraulic pressure in the hydraulic cylinder 50 is decreased to free the piston 52, and the first cylinder mechanism 11 is operated by the hydraulic pump 14 so as to move up its piston rod 54. As a result of this upward movement, the movable block 10 is lifted up, as shown in FIG. 6, and accordingly, the pressure chamber defining member 6, the attachment 7, the hydroextracting chamber defining member 5 and the upper filter cloth 9, which are connected by the metallic fastener means 35, are likewise lifted up and detached from the bean jam 55.

At this bean jam releasing operation, because of the peripheral walls 28 of the hydroextracting chamber 27 which are tapered and the weight of the hydroextracted bean jam 55, the bean jam 55 is easily separated from the upper filter cloth 9 and the hydroextracting chamber defining member 5 and left on the lower filter cloth 4.

During the bean jam releasing operation, the hydraulic pressure in the hydraulic cylinder 50 is low, and the piston 52 is free. Consequently, the piston rod 52 retreats in accordance with the upward movement of the movable block 10 so that the movable block 10 can be lifted, without restriction by the second hydraulic cylinder mechanism 13, to such a high position that removal of the bean jam 55 can be conducted with ease, as shown in FIG. 6. When the bean jam releasing operation is completed, the bean jam 55 is removed from the hydroextracting unit.

In order to perform the hydroextracting operation again, the steps of the above-described bean jam releasing operation are repeated in the reverse order. That is to say, in the hydroextracting unit of the state shown in FIG. 6, the first cylinder mechanism 11 is operated to move its piston rod 54 downwardly, and the hydroextracting chamber defining member 5 is lowered to the vicinity of the drain plate 3 (to almost the same position as shown in FIG. 5). Then, each of the second cylinder mechanisms 13 is operated to project its piston rod 52. As a result, the line A passing through the centers of the rotation shafts 45 and 48 is displaced beyond the center B of the rotation shaft 43, and the hydroextracting chamber defining member 5 is strongly pressed against the drain plate 3 through the lower filter cloth 4, so that the hydroextracting chamber 27 is closed, and that it is locked in the closed condition. After this locking operation, the hydroextracting operation is similarly performed as described above.

Although the above description relates to the case where the invention is applied to hydroextraction of the bean stew, the invention can of course be applied to hydroextraction of other substances.

Figure 9:
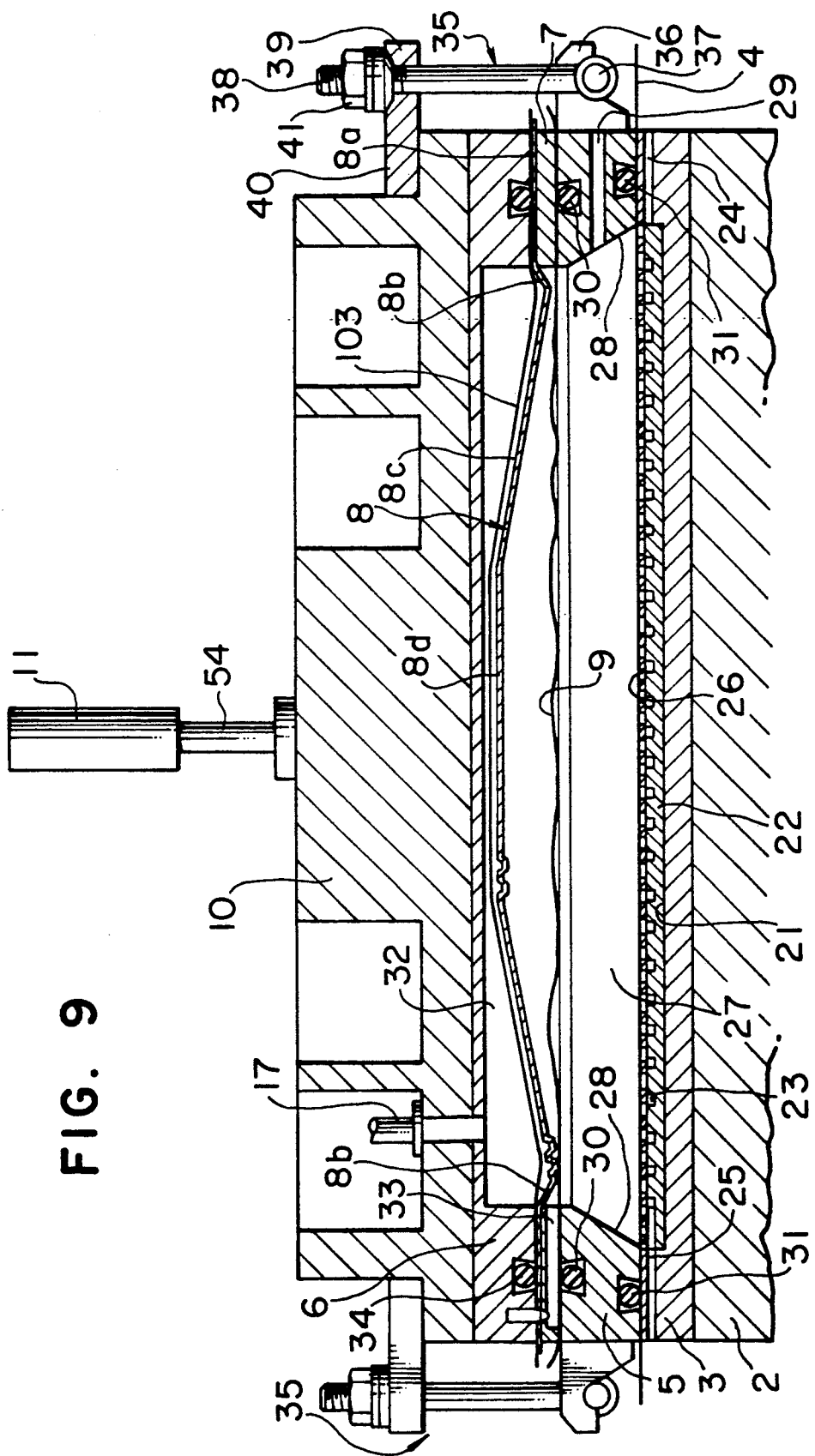
FIG. 9 is a schematic elevational view showing a modification from the embodiment shown in FIG. 1.

The above embodiment may have a modification as shown in FIG. 9. In this modified embodiment, a rubber plate 103 is provided on the upper surface of the diaphragm 8. Even if the diaphragm is cracked, the rubber plate 103 prevents the pressurized water in the pressure chamber 32 from entering the hydroextracted bean jam through the diaphragm 8 and the upper filter cloth 9.

Figure 10:
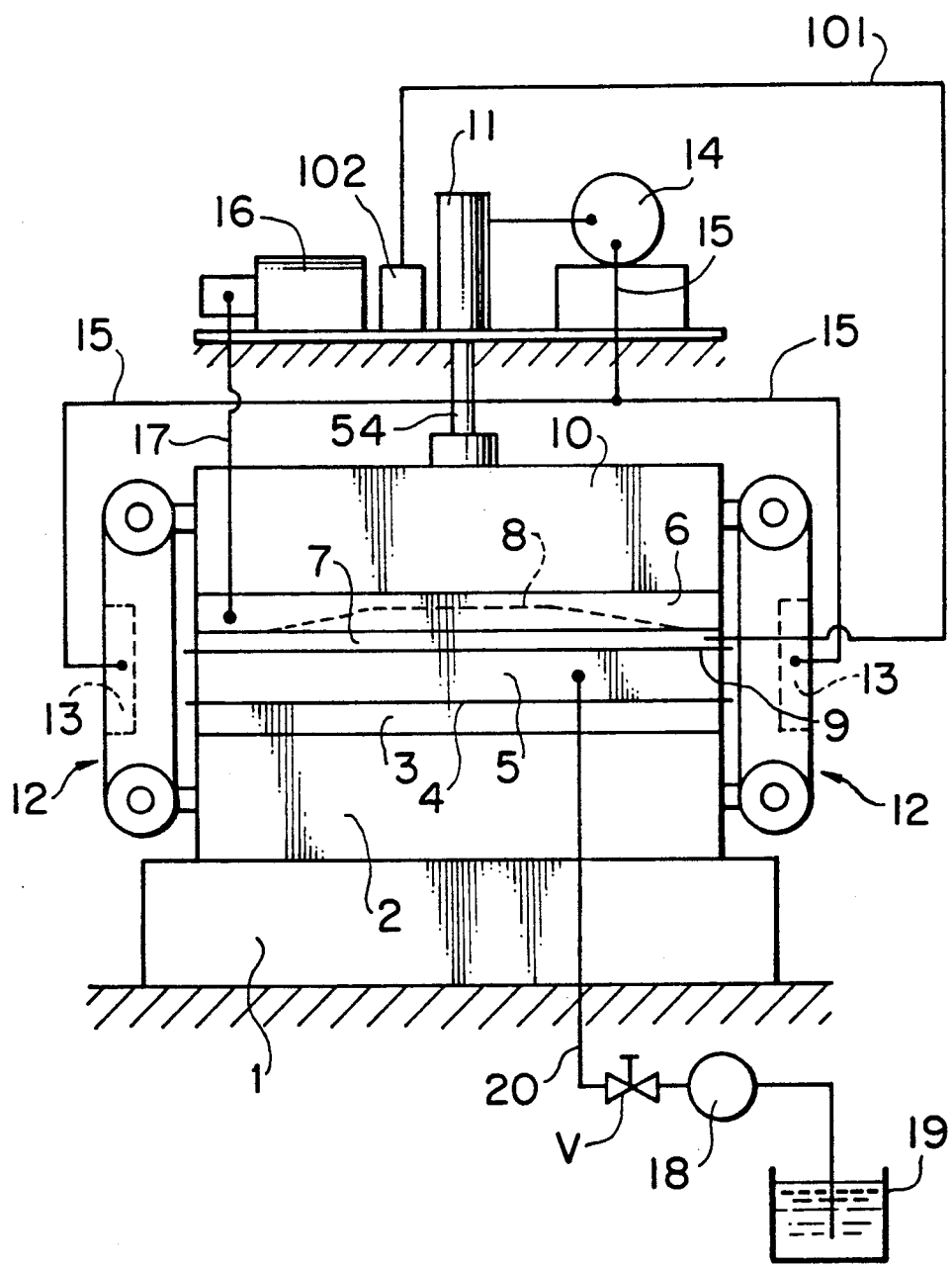
FIG. 10 is a schematic elevational view showing another modification from the embodiment shown in FIG. 1.
Figure 11:
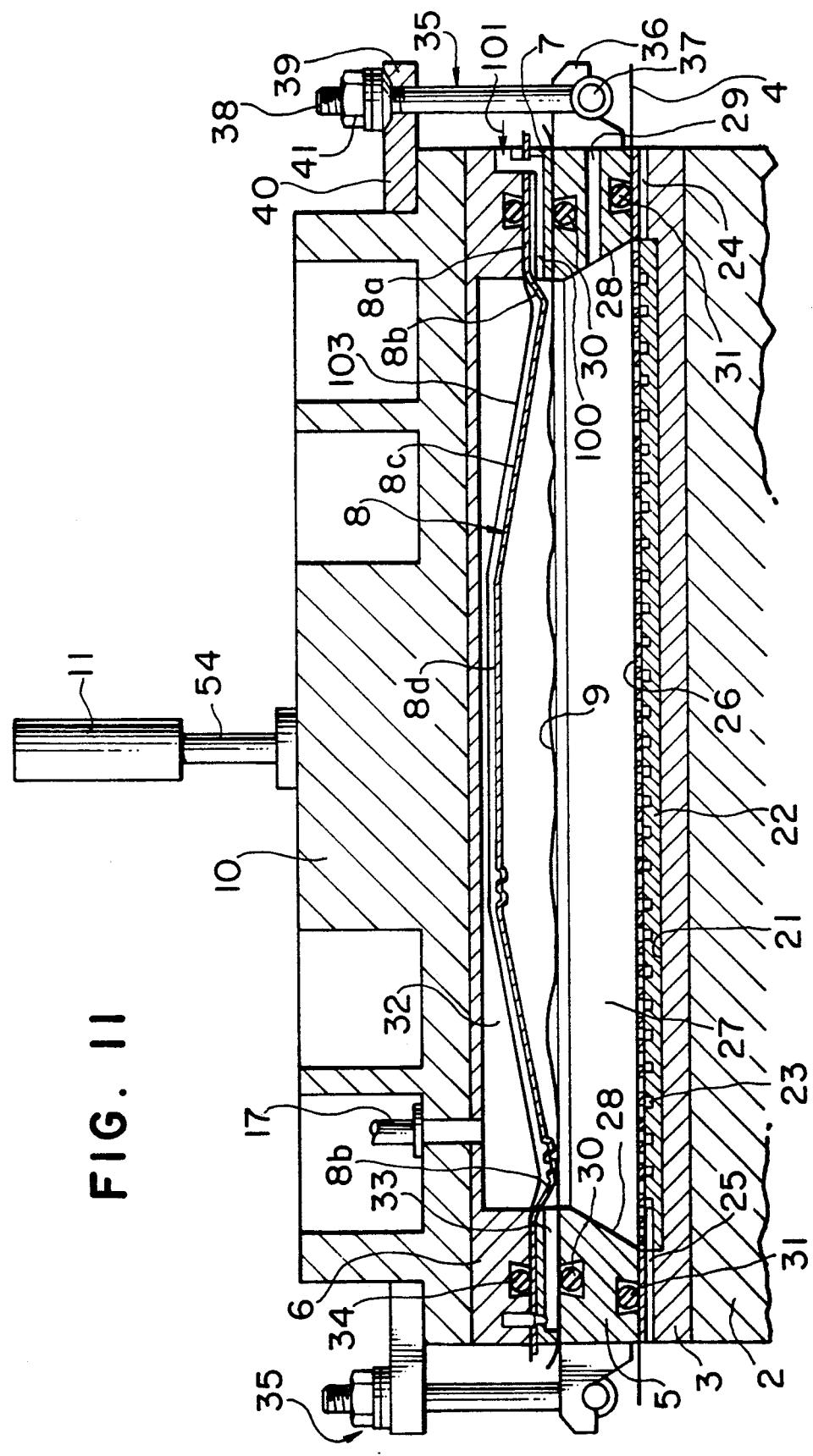
FIG. 11 is an elevational cross-sectional view showing an essential portion of FIG. 10.
Figure 12:
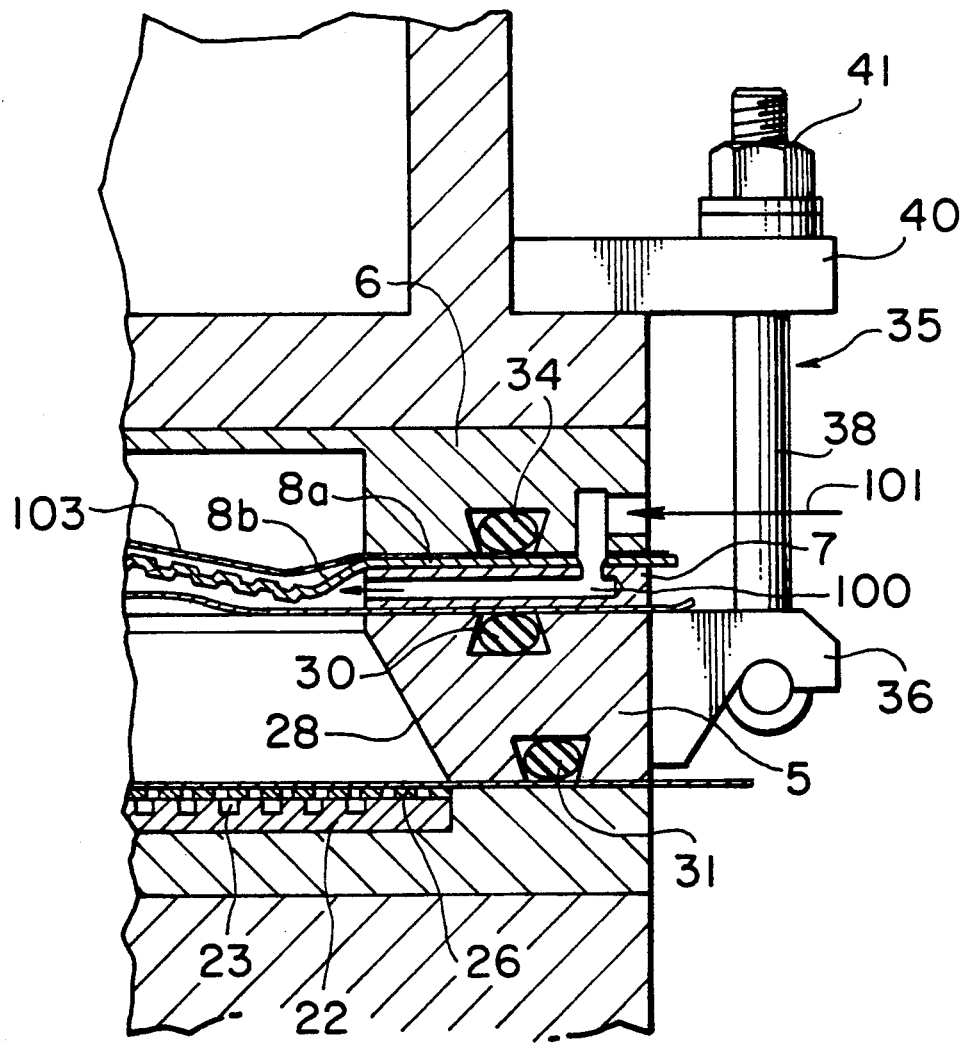
FIG. 12 is an enlarged elevational cross-sectional view showing a compressed air introduction portion of FIG. 11.

Another modification from the above embodiment according to the invention will be shown in FIGS. 10 to 12. In these drawings, the same component parts as in the first embodiment are denoted by the same reference numerals.

In this modified embodiment, as shown in FIG. 12, an air conduit 100 is formed in the attachment 7 of the first embodiment so that the operation for releasing a cake of bean jam can be further facilitated. This air conduit 100 serves as a separation means for introducing the compressed air between the diaphragm and the upper filter cloth and separating the upper filter cloth from the diaphragm. The inner end of the air conduit 100 is opened between the diaphragm 8 and the upper filter cloth 9, whereas the outer end is connected through a pipe 101 to an air pump 102, as shown in FIG. 10.

The operation of the modified embodiment is similarly performed as the first embodiment. After the pressure operation is conducted by pressing the central portion 8d of the diaphragm 8 down to substantially the same level as the peripheral end portions 8a, the fluid pump 16 is stopped to decrease the fluid pressure in the pressure chamber 32. Simultaneously, the compressed air is rapidly introduced through the air conduit 100 between the diaphragm 8 and the upper filter cloth 9.

In consequence, the central portion of the diaphragm 8 returns to the upper position owing to the resilient force of the bent portions 8b and the pressure of the compressed air, and the upper filter cloth 9 is forcibly separated from the diaphragm 8. Also, the compressed air acts on the surface of the cake through the upper filter cloth 9 so as to separate the upper filter cloth 9 from the cake. Further, the impact of the original form recovery of the diaphragm 8 and the impact of the introduction of compressed air accelerate the separation of the cake.

After that, in the same manner as the first embodiment, the air is forcibly introduced from the pressurized air inlet 24 so as to discharge water remaining in the drain path 23 out of the drain hole 25. Subsequently, each of the lock mechanisms 12 is likewise released.

At this cake releasing operation, because of the peripheral walls 28 of the hydroextracting chamber 27 which are tapered and the weight of the hydroextracted bean jam 55, the bean jam 55 is easily separated from the hydroextracting chamber defining member 5 and left on the lower filter cloth 4.

The subsequent operation is the same as the first embodiment so that the explanation will be omitted.

As a still other modification from the first embodiment, the planar configuration of the hydroextracting chamber may be circular, and the bent portions and the central portion of the diaphragm may also have a circular configuration.

According to the present invention, as described heretofore, when the liquid material is introduced forcibly into the hydroextracting chamber, the diaphragm has the central portion raised up so that the hydroextracting chamber has a large volume. Therefore, the material introduction pressure can be smaller and the filling time of the material to be processed can be shorter than those in the conventional case where the rubber plates are employed. Thus, the operational efficiency can be improved.

Moreover, because the hydroextracting chamber, the upper filter cloth and the diaphragm extend substantially horizontally, and because the diaphragm is automatically detached from the cake at the time of the cake releasing operation, the cake is left on the lower filter cloth after it is released, and consequently, removal of the cake can be performed extremely easily in comparison with the conventional vertical-type hydroextractor.

Furthermore, with the separation means for introducing the compressed air between the diaphragm and the upper filter cloth and separating the upper filter cloth from the diaphragm, the original form recovery of the diaphragm and the separation of the upper filter cloth from the diaphragm can be carried out without fail by introducing the compressed air between the diaphragm and the upper filter cloth at the time of the hydroextracting operation, so that the cake releasing operation can be automatically effected in reliable manner.

What is claimed is:

1. A hydroextractor comprising a hydroextracting chamber defining member extending substantially horizontally to define a hydroextracting chamber which is openable at a top and a bottom thereof, upper and lower filter cloths provided at the top and the bottom of said hydroextracting chamber, a diaphragm placed substantially horizontally on an upper side of said upper filter cloth, a pressure chamber formed on an upper side of said diaphragm, and raising and lowering means for pressing said hydroextracting chamber defining member against said lower filter cloth and detaching it from said lower filter cloth, said diaphragm being shaped like an inverted dish, including peripheral end portions to be fixed, bent portions on inner sides of said peripheral end portions, and tapered portions on inner sides of said bent portions, which tapered portions are raised gradually toward a central portion of said diaphragm.

2. A hydroextractor according to claim 1, characterized in that it further includes a rubber plate provided on an upper surface of said diaphragm.

3. A hydroextractor according to claim 1, characterized in that it further includes separation means for introducing compressed air between said diaphragm and said upper filter cloth and separating the upper filter cloth from the diaphragm.

4. A hydroextractor according to claim 3, characterized in that it further includes a rubber plate provided on an upper surface of said diaphragm.

5. A hydroextractor according to claim 1, characterized in that said hydroextracting chamber has a substantially square configuration.

6. A hydroextractor according to claim 3, characterized in that said diaphragm includes said bent portions and the central portion which have substantially square configurations.

7. A hydroextractor according to claim 1, characterized in that said diaphragm includes said bent portions and the central portion which have substantially circular configurations.

8. A hydroextractor according to claim 2, characterized in that said diaphragm includes said bent portions and the central portion which have substantially circular configurations.

9. A hydroextractor according to claim 1, characterized in that said hydroextracting chamber have peripheral walls which are tapered so that the chamber is enlarged gradually toward the bottom.

10. A hydroextractor according to claim 1, characterized in that said raising and lowering means include lock mechanisms.

* * * * *